United States Patent
McKenzie

[11] 3,710,562
[45] Jan. 16, 1973

[54] DUAL ELEMENT AIR FILTER

[75] Inventor: Malcolm S. McKenzie, Van Nuys, Calif.

[73] Assignee: Sandmaster Company, Van Nuys, Calif.

[22] Filed: March 27, 1972

[21] Appl. No.: 238,424

[52] U.S. Cl. ....................55/487, 55/498, 55/505, 55/510, 55/521, 55/524, 55/DIG. 28
[51] Int. Cl. ................................B01d 46/00
[58] Field of Search........55/482, 485, 486, 487, 488, 55/489, 498, 500, 502, 505, 506, 507, 510, 521, DIG. 28, DIG. 13, 504, 524; 210/315, 342, 338

[56] References Cited

UNITED STATES PATENTS

| | | | |
|---|---|---|---|
| 2,848,065 | 8/1958 | Sebok | 55/502 X |
| 2,966,234 | 12/1960 | Alexander | 55/507 X |
| 3,012,631 | 12/1961 | Kaser | 55/505 X |
| 3,308,610 | 3/1967 | Springer et al. | 55/522 X |
| 3,488,928 | 1/1970 | Tarala | 55/510 X |

FOREIGN PATENTS OR APPLICATIONS 779,904   7/1957   Great Britain..........................55/276

*Primary Examiner*—Dennis E. Talbert, Jr.
*Attorney*—Lowell G. Turner

[57] ABSTRACT

A dual element, self cleaning air filter for cleaning excessively dirty air. A base contains a central air outlet nozzle and retains a bracket which supports a cover in spaced relation from the base. The cover includes a depending flange which extends in an adjacently spaced relation with respect to the margin of the base. An outer, pleated paper-type filter and an inner, resilient foam filter in mutually spaced concentric relation extend between and are positionally retained by the base and the cover. An air inlet passage is defined between the depending flange and the outer filter.

6 Claims, 2 Drawing Figures

DUAL ELEMENT AIR FILTER

BACKGROUND OF THE INVENTION

The cleaning of excessively dirty air is a difficult and exacting task. Many technical approaches have been used in an attempt to solve the problems associated therewith, particularly in relation to circumstances wherein vehicles have been required to operate in dirt and sand, as in construction activities, for example. This task has become more acute in recent years, since off-road racing, dune buggy sports and motorcycling in sand dunes and remote wilderness regions have achieved great popularity.

Vehicles engaged in these activities, particularly in racing, must function continuously in environments wherein that air which is eventually to be passed through the carburetor is virtually loaded with contaminants stirred up, thrown about and blown by the speeding vehicles. Irrespective of the hostility of this environment, and difficulties encountered in operating within it, when the air is delivered to the carburetor it must be clean and grit-free.

The engines of numerous vehicles engaged in pleasure, sport and work activities have been permanently damaged by the ingestion through the carburetor and into the engine of contaminant particles entrained within the inlet air. This has resulted from the inability of existing filters operating under these trying circumstances to effectively provide that degree of protection required for extended time periods.

Off-road racing recreation vehicles, and dune-buggy activities are, in the usual instance, performed in the desert or remote regions where conditions of the character described are at their worst. Therefore, they are especially vulnerable and often suffer engine damage, to the point of virtual engine destruction. Unfortunately, construction equipment such as trucks, slip-loaders, bulldozers, etc. also suffer similar damage.

Vehicles operating under the described conditions, as well as snowmobiles, are also plagued by the caking of dirt or snow upon the exterior of their filter elements, thereby cutting off their air supplies, starving the engines and often causing engine slow-down and stoppage. This condition is particularly prevelant in off-road racing and snowmobile racing wherein the vehicles are sometimes required to operate for several hundred miles, virtually at full throttle. An air stoppage of this nature often spells the difference between winning and losing a race.

BRIEF DESCRIPTION OF THE INVENTION

The filter of this invention is specifically designed to function effectively and efficiently under the adverse conditions described. Its dual filter construction, when properly serviced, successfully removes virtually one hundred percent of the contaminent particles from the carburetor air. Filter clogging and the concommitant loss of carburetor air supply are also substantially, if now wholly, obviated.

Whereas standard pleated paper filters remove the bulk of the larger particles, they are unsuccessful in removing particulate matter. Similarly, the reverse is also true, i.e., foamed plastic filters can remove particulate matter, but are unable to prevent the penetration of large dirt particles, rocks, or small sand particles; Neither will this latter filter accept large deposits of caked dirt without clogging.

In this invention a first pleated paper filter is positioned within a container, its external diameter substantially matching the external diameter of a base member upon which it rests. A cover, engaging the opposite end of this filter, includes a depending flange spaced concentrically outward from this outer filter such that any dirt caked upon the external surface of the filter, when shaken loose by the vibrating of the vehicle and the pulsation of the engine to which it is attached, is permitted to fall free of the entire filter structure.

A secondary or inner filter, also positioned upon the base member, is located concentrically within the first filter in spaced relation therefrom. This second filter, which can be termed a safety element, is of foamed plastic construction, usually of the oil-wetted variety, adapted to remove a maximum of particulate matter. Any dirt caked upon its surface is also vibrated loose and enabled to fall onto the base member between the filters.

A tapered neck extends downward from a position centrally of the inner filter, providing an air outlet and adapting the filter combination to fit a variety of carburetor openings.

It is therefore an object of this invention to provide a filter means capable of continuous and extended utilization in environments wherein unusually severe dirt and dust conditions prevail. Other objects include the provision of a self-cleaning capability, as well as self-locating and sizing features for adaptation to a variety of air-receiving structures.

Other objects of this invention will become apparent upon examination of the accompanying specification, drawings and claims.

DETAILED DESCRIPTION OF THE DRAWINGS

Figure 1:
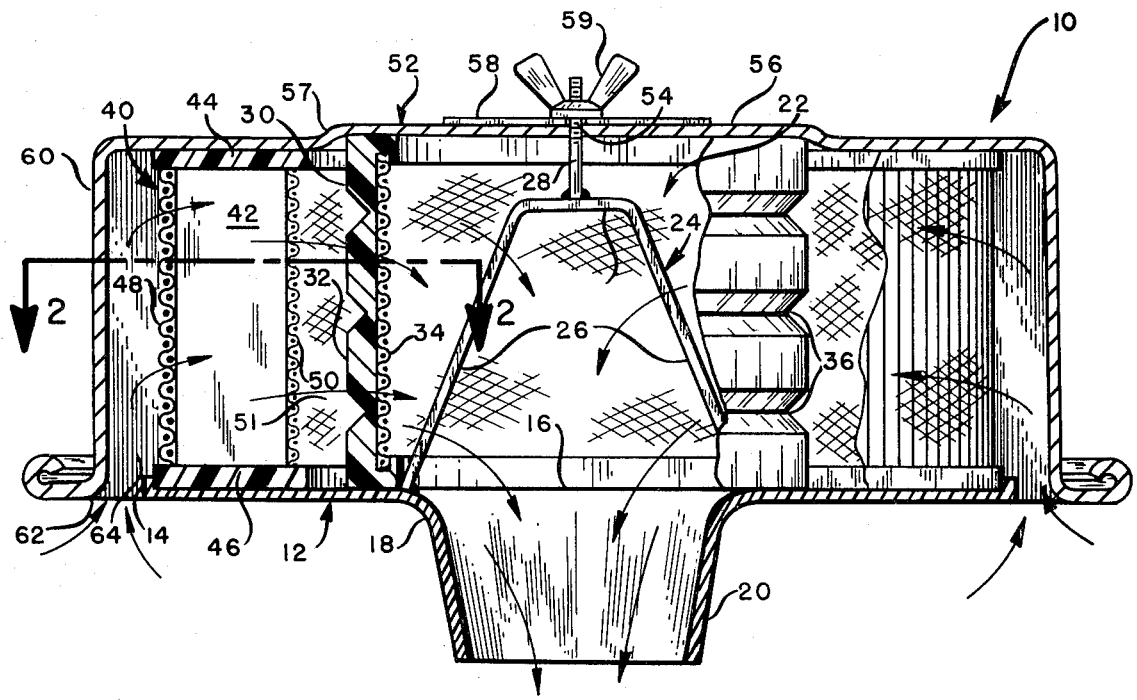
FIG. 1 is an elevational view partially cut away to illustrate the primary features of the invention.
Figure 2:
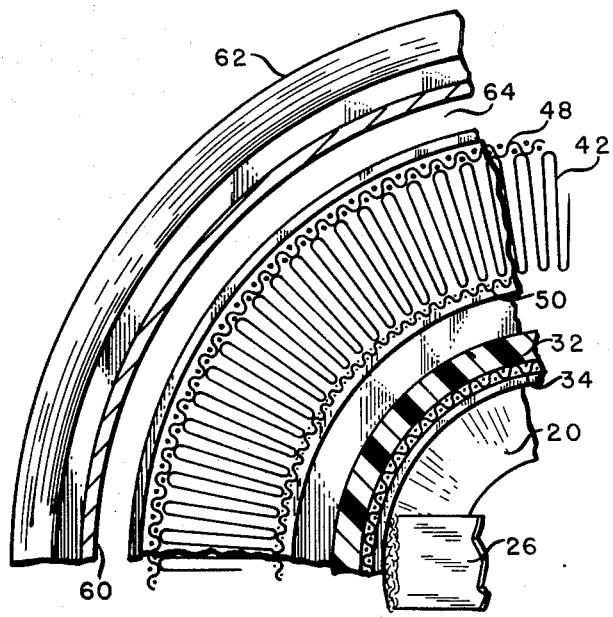
FIG. 2 is a sectional view taken along line 2—2 of FIG. 1.

Referring now to the drawings in detail, FIG. 1 illustrates, partly in section and partly in side elevation, cut away to show its principal features, the basic filter combination of the invention, the overall combination being generally identified by the numeral 10.

A container portion comprises a base member, a support bracket assembly, and a cover. The base member is of generally flat, plate-shaped configuration, having an upwardly extending lip 14 upon its margin. Provided centrally of the base 12 is an air outlet 16. Although the illustrated air outlet configuration is not mandatory, it is preferred. It comprises a gently curved region 18 adjacent the flat portion of the base 12, gradually blending into a tapered section 20 of generally truncated conical shape. This outlet configuration results in a smooth air-flow characteristic in its air-turning requirement, a venturi action in speeding up the air flow in the outlet region, and in an ability to position the tapered neck 20 within a variety of sizes of carburetor inlets or such other structure as this filter may be adapted to.

The bracket assembly 22 includes a bracket 24 having a pair of legs 26 joined by a strap 27 at their upper extremities, usually in a continuous member. The bracket legs 26 are welded or otherwise fixed to the base member 12 adjacent the marginal region of the outlet 16 and providing a positioning means for a filter to be described.

A rod or bolt 28, threaded at its upper extremity, is attached to the strap 27 and extends upward for securing a cover to be later described.

An inner, commercially available, filter member 30, preferably having a tubular-shaped element 32 of foamed plastic construction, is usually supported by an internally disposed screen 34. The foamed plastic element 32 also preferably includes a plurality of grooves 36 such that vehicle vibrations and engine pulsations cause any dirt built up or caked on the external periphery of the filter element to flake off and fall from the filter onto the base 12, where it collects harmlessly until such time as the assembly is cleaned. The ability of this filter to breath thereby remains unaffected.

This filter is also adapted to be oil-wetted, further providing a fine dirt-trapping capability without detrimental effect upon its air breathing capability. A filter element of this type, and suitable for application in the filter combination of this invention is shown in U.S. Pat. No. 3,491,891.

This inner filter 30 has an internal diameter substantially equal to the distance across the lower extremities of the bracket legs 26, those legs thereby providing a means for locating the filter in its proper concentric orientation around the air outlet 16.

Surrounding the inner filter 30 in a concentrically spaced relationship thereto is an outer filter member 40 having a core 42 of standardized dry, pleated paper construction. This filter preferably, although not mandatorily, includes solid top and bottom retainers 44 and 46 and inner and outer screens 48 and 50, respectively, protecting their contiguous filter surfaces. In the usual case the outer screen 48 is of a relatively coarse mesh, whereas the inner screen 50 is of a fairly fine mesh.

The lower extremity of the filter 40, or its lower retainer 46, rests upon the base 12 and is retained and positioned relative thereto by the lip 14.

A space 51 is defined between the filters 30 and 40 for the accumulation of flaked contaminant materials as described above.

A cover 52, which defies a portion of the aforementioned container, is centrally perforated, as at 54, to receive the bolt 28. This cover includes an upper relatively flat portion 56 configured to contact the upper marginal regions of the filters 30 and 40 in sealing relationships and to retain those filters in their respective positions in cooperation with the structural features heretofore described. It is preferable that the filter 30 be slightly longer than is the filter 40, and of a length such that its ends are caused to be compressed slightly when the cover 52 is brought into contact with the upper extremity of the filter 40, thereby effecting a firm sealing relation between the filter 30 and the cover 52.

The cover 52 may be configured to include a depression 57 or other suitable means to receive and retain the filter 30. A washer 58 and a wing nut 59, mounted on the bolt 54, are provided to tighten and retain the position of the cover 52.

Extending downward in a depending relationship from the flat portion 26 of the cover is a circumferential flange 60, usually beaded or otherwise stiffened, as at 62, for structural integrity, i.e., to resist deformation from physical contacts and deflections from air intake pulsations.

The flange 60 is of a diameter larger than the outer diameter of the outer filter 40 and the base lip 14, that difference being sufficient to define and air passage 64 between the filter 40 and the flange 60. The width of passage 64 may vary in accordance with the size of the filter, being matched therewith to facilitate an optimum air flow for the particular parameters of the unit to which it is adapted.

The flange 60 is of a length to extend over the full length of the filter elements, thus providing a minimal exposure to and maximum protection for any foreign objects which may fly toward the filter elements.

It will also be recognized that the shaken loose or flaked off dirt deposits which tend to collect upon the outer surface of the outer filter 40 during operation, are subject to self-removal by virtue of this feature of the invention. Due to the fact that the direct opening to atmosphere is at the lower extremity of the unit, any dirt deposits so expelled from the filter surface are enabled to drop, free of structural intereference, and be completely removed from the environs of the filter. All tendency for sediment buildup, such as exists with conventional filter configurations, is thereby obviated, the useful maintainance-free life of the filter being extended in like amount. This ability if found to be of primary importance in those environments wherein this invention finds its greatest utility. Through its use, the mean time between maintenance procedures has been extended by approximately 50 percent over other competing filters.

OPERATION OF THE INVENTION

Installation of this filter combination is accomplished by inserting the tapered section 20 into the air inlet in the carburetor to which it is to be adapted until the tapered wall fits snugly therein. It is then clamped or otherwise firmly secured in that position by conventional attachment means (not shown).

During operation of the vehicle to which the filter is adapted, particularly where dirt-motorcycles or automobiles and dune buggies are engaged in off-road racing, and recreational activities, great volumes of dirt, sand and rocks are kicked up by the spinning and churning of the vehicle wheels, such contaminants ranging in size from about one-fourth of an inch in diameter down to essentially the fineness of talc. The filter of this invention, positioned in the midst of this hostile environment, is required to prevent all rocks dirt and sand, irrespective of their broad variety of textures, from entering the filter, and to separate the same from the air stream and consistently deliver to the carburetor a continuous stream of clean, dirt-free air for extended time periods. This is accomplished by the unique combination of elements in their relationships described above.

Air enters the filter through the passage 64, carrying with it all manner of grit. Rocks which would otherwise tend to engage the external surface of the outer filter element 40 air intercepted by the flange 60. Smaller rocks and heavy sand and dirt particles, which sometimes circumvent this obstacle, are usually engaged by the coarse screen 48 and thereby prevented from striking the pleated filter core 42. Those particles which are not so stopped, together with all dirt, sand and the like which are entrained in the air stream, do succeed in engaging the outer surface of this core element. This core, although being highly porous to facilitate a free passage of air, nevertheless includes a minute perforate structure to obviate the passage of all except the finest of dirt particles. Additionally, however, due to the relative toughness and resiliency of this core, it is capable of rejecting other particles of a relatively large size. The surface of the core is used dry to eliminate any tendency of dirt caked thereupon from adhering tenaciously to the surface.

Over a period of time, particularly during operation within hostile environments of the character described, matting or caking of dirt upon the surface of the core element 42 nevertheless occurs. As such buildup takes place, vehicle and engine vibrations, cause it to crack, flake off and be removed completely from the environs of the filter by the action of gravity and by virtue of the bottom-opening air passage and its inherent lack of structural interference to such removal. This self-cleaning feature thereby eliminates the necessity for stopping and emptying accumulations of sediment which would otherwise occur, and which are a constant source of irritation to vehicle operators when filters of conventional configuration are used. This advantage over prior art filters achieves a significance of monumental proportions during races. There, the driver who loses an undue amount of time as a result of vehicle maintenance requirements can also expect to lose the race.

Although the filter member 40 successfully removes from the airstream by far the largest majority of contaminants entrained therein, fine, talc-like particulate matter cannot be removed in its entirety by filters of this character. Since even grit of this fine consistency is extremely harmful to engine components it is desirable that it too be removed. This is accomplished efficiently by the secondary or inner filter 30 in the manner heretofore described, any accumulated dirt dropping and being retained in the space 51, which is specifically provided for this purpose.

It will be recognized that through the cooperative action of the novel combination of elements of this invention, as described above and illustrated in the accompanying drawings, the objects of invention may be readily accomplished.

I claim:

1. A dual filter for a contaminated air stream, the combination comprising:
   a base member including air outlet passage means disposed centrally thereof;
   a first generally cylindrical open ended filter upon said base member concentric with said outlet passage means,
   said first filter fabricated from foamed material adapted for oil-wetting to permit air passage therethrough while removing small dirt particles from the airstream,
   screen means positioned against and supporting said first filter downstream thereof,
   filter-locating means upon and acting at said base member to maintain said concentricity,
   a second generally cylindrical filter, including pleated paper-like filter element, positioned upon said base member concentrically surrounding said first filter in spaced relation thereto for preventing the passage of a major portion of small foreign particles therethrough,
   and second filter, including coarse metallic screen means enclosing said filter element, and adapted to permit the passage of air therethrough;
   cover attachment means fixed to and extending from said base member;
   a cover member retained by said cover attachment means, spaced from said base member, removably engaging with each of said filters and confining each of said filters between said cover member and said base member, and including
      a depending skirt member substantially encompassing the length as said filters and cooperating with said outer filter to define an air inlet to said dual filter.

2. The filter of claim 1 wherein
said filter is of foamed plastic and
said second filter is of pleated filter paper.

3. The filter of claim 1 wherein
a fine textured screen is positioned circumferentially within and in contact with said second filter.

4. The filter of claim 1 wherein
said air outlet passage means is configured as an inwardly tapered nozzle-like structure.

5. The filter of claim 4 wherein
a bracket attached to said base member straddles said air outlet passage means, extends toward said cover member, and is of a width at its attachment position to said base member substantially matching the internal diameter of said first filter means,
bolt means affixed to said bracket and adapted for removably attaching and retaining the position of said cover member,
the relative lengths of said filter members being such as to facilitate a contact and an axial compression of said first filter means before contacting and stopping against said second filter means.

6. The filter of claim 1 wherein said filter is oil wetted.

* * * * *